US010526770B2

(12) United States Patent
Valinejadshoubi et al.

(10) Patent No.: US 10,526,770 B2
(45) Date of Patent: Jan. 7, 2020

(54) GREEN DYNAMIC SHADING SYSTEM FOR IMPROVING ENERGY EFFICIENCY IN BUILDINGS

(71) Applicants: Masoud Valinejadshoubi, Mazandaran (IR); Fatemeh Khodabandehamiri, Mazandaran (IR)

(72) Inventors: Masoud Valinejadshoubi, Mazandaran (IR); Fatemeh Khodabandehamiri, Mazandaran (IR)

(*) Notice: Subject to any disclaimer, the term of this patent is extended or adjusted under 35 U.S.C. 154(b) by 0 days.

(21) Appl. No.: 15/712,108

(22) Filed: Sep. 21, 2017

(65) Prior Publication Data
US 2018/0073221 A1    Mar. 15, 2018

(51) Int. Cl.
| | | |
|---|---|---|
| *E03B 3/03* | (2006.01) | |
| *E04B 1/00* | (2006.01) | |
| *E06B 9/32* | (2006.01) | |
| *E04B 1/76* | (2006.01) | |
| *A01G 9/02* | (2018.01) | |
| *E06B 7/02* | (2006.01) | |
| *E06B 7/14* | (2006.01) | |
| *E06B 9/24* | (2006.01) | |
| *E04F 10/02* | (2006.01) | |
| *A01G 9/12* | (2006.01) | |

(52) U.S. Cl.
CPC .............. *E03B 3/03* (2013.01); *A01G 9/02* (2013.01); *A01G 9/12* (2013.01); *E04B 1/0023* (2013.01); *E04B 1/7645* (2013.01); *E04F 10/02* (2013.01); *E06B 7/02* (2013.01); *E06B 7/14* (2013.01); *E06B 9/24* (2013.01); *E06B 9/32* (2013.01); *E06B 2009/2452* (2013.01); *E06B 2009/2482* (2013.01)

(58) Field of Classification Search
CPC .... E03B 3/03; E04F 10/02; E06B 9/24; E06B 7/02; E04B 1/7645; A01G 9/12; A01G 9/02
USPC ... 52/1, 573.1, 782.22, 782.23, 784.1, 791.1
See application file for complete search history.

(56) References Cited

U.S. PATENT DOCUMENTS

| | | | |
|---|---|---|---|
| 6,084,231 A | 7/2000 | Popat | |
| 8,561,372 B2 * | 10/2013 | Fujimoto | F24F 5/0075 165/201 |
| 8,627,597 B2 | 1/2014 | Cabello | |
| 9,366,403 B2 * | 6/2016 | Kashiwagi | B29C 43/021 |
| 2009/0320388 A1 | 12/2009 | Lilli | |
| 2011/0017301 A1 | 1/2011 | Canavan | |
| 2012/0061029 A1 * | 3/2012 | Weston | E06B 9/06 160/6 |
| 2014/0303788 A1 | 10/2014 | Hakkarainen | |
| 2015/0247267 A1 * | 9/2015 | Corey | D03D 19/00 29/897.31 |

* cited by examiner

Primary Examiner — Brian E Glessner
Assistant Examiner — Adam G Barlow
(74) Attorney, Agent, or Firm — NovoTechIP International PLLC

(57) ABSTRACT

An environmental system is disclosed. The environmental system is configured to provide varying degrees of ventilation and shading. In addition, the environmental system can include provisions for collecting rainwater and holding greenery. The system can includes a mounting structure, a set of frames, a plurality of bars, skins, beams, and optionally one or more plants.

17 Claims, 15 Drawing Sheets

GREEN DYNAMIC SHADING SYSTEM FOR IMPROVING ENERGY EFFICIENCY IN BUILDINGS

CROSS-REFERENCE TO RELATED APPLICATION

This application claims priority to Iranian Patent Application Serial Number 139550140003008766 filed on Oct. 12, 2016, the content of which is incorporated herein by reference in its entirety.

BACKGROUND

Fossil fuel consumption in buildings in usually quite high and reducing this can help in preserving the irreplaceable resources and protecting the environment. The proposed invention can help promote this goal by facilitating effective shading and ventilation for building depending on the season. It will also make efficient use of the rainwater and aid in the beautification of the environment by providing greenery. It can be incorporated in any building during or after the construction process.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure is directed to a ventilation system for a building. The system includes a mounting structure with a first frame, where a first skin is mounted onto the first frame. In addition, the first skin includes a plurality of openings, and the plurality of openings include a first opening that is configured to change in size, where the first opening has a first size when the first skin is at a first temperature, the first opening transitions to a smaller, second size when the first skin is at a second temperature, and where the second temperature is different from the first temperature.

The above general aspect may include one or more of the following features. For example, the first opening may return to the first size when the first skin is at the first temperature again, and/or the second temperature may be lower than the first temperature. In some cases, the mounting structure further includes a second frame, where the second frame is spaced apart from the first frame by at least a first bar. In another implementation, a second skin is mounted on the second frame, and the second skin is substantially similar to the first skin. The first skin may include a shape memory alloy material. In addition, each of the plurality of openings can be configured to change in size automatically in response to changes in temperature. Furthermore, in some cases, the system includes a rainwater collection apparatus that is disposed between the first skin and the second skin, and the rainwater collection apparatus includes a first receptacle configured to store water. The system may also include a second receptacle configured to support a living plant. In another case, the first skin has a closed configuration and an open configuration, and a surface area of the first skin is larger in the open configuration relative to the closed configuration.

In another general aspect, the present disclosure is directed to a shading system for a building. The system includes a mounting structure with a first frame and a second frame, where the first frame and the second frame are substantially parallel to one another. A first skin is mounted onto the first frame, a second skin is mounted onto the second frame, and a first motor assembly is disposed between the first skin and the second skin, where the first motor assembly including a first motor and a first coil. The first motor assembly is configured to transition the first skin between a closed configuration and an open configuration, where a surface area of the first skin is greater in the open configuration than the closed configuration.

The above general aspect may include one or more of the following features. For example, the system can include a second motor assembly, where the second motor assembly includes a second motor and a second coil, and the second motor assembly is configured to transition the second skin between the closed configuration and the open configuration. The first motor assembly and the second motor assembly can operate independently of one another. In addition, the system can include a programmable circuit arranged to automatically operate the first motor assembly, and/or a programmable circuit arranged to operate the first motor assembly in response to a command signal received from a remote station. In another example, the first skin may include a plurality of openings, the plurality of openings being configured to provide additional ventilation in the open configuration. In some cases, the plurality of openings include a first opening that is configured to change in size, where the first opening has a first size when the first skin is at a first temperature, where the first opening transitions to a smaller, second size when the first skin is at a second temperature, and where the second temperature is different from the first temperature. Furthermore, the first skin can include a shape memory alloy material. In some cases, the system includes a rainwater collection apparatus that is disposed between the first skin and the second skin, where the rainwater collection apparatus includes a first receptacle that is configured to store water. In another implementation, the first skin includes a substantially hourglass shape in the closed configuration and a substantially stretched, flat shape in the open configuration.

Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the following claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
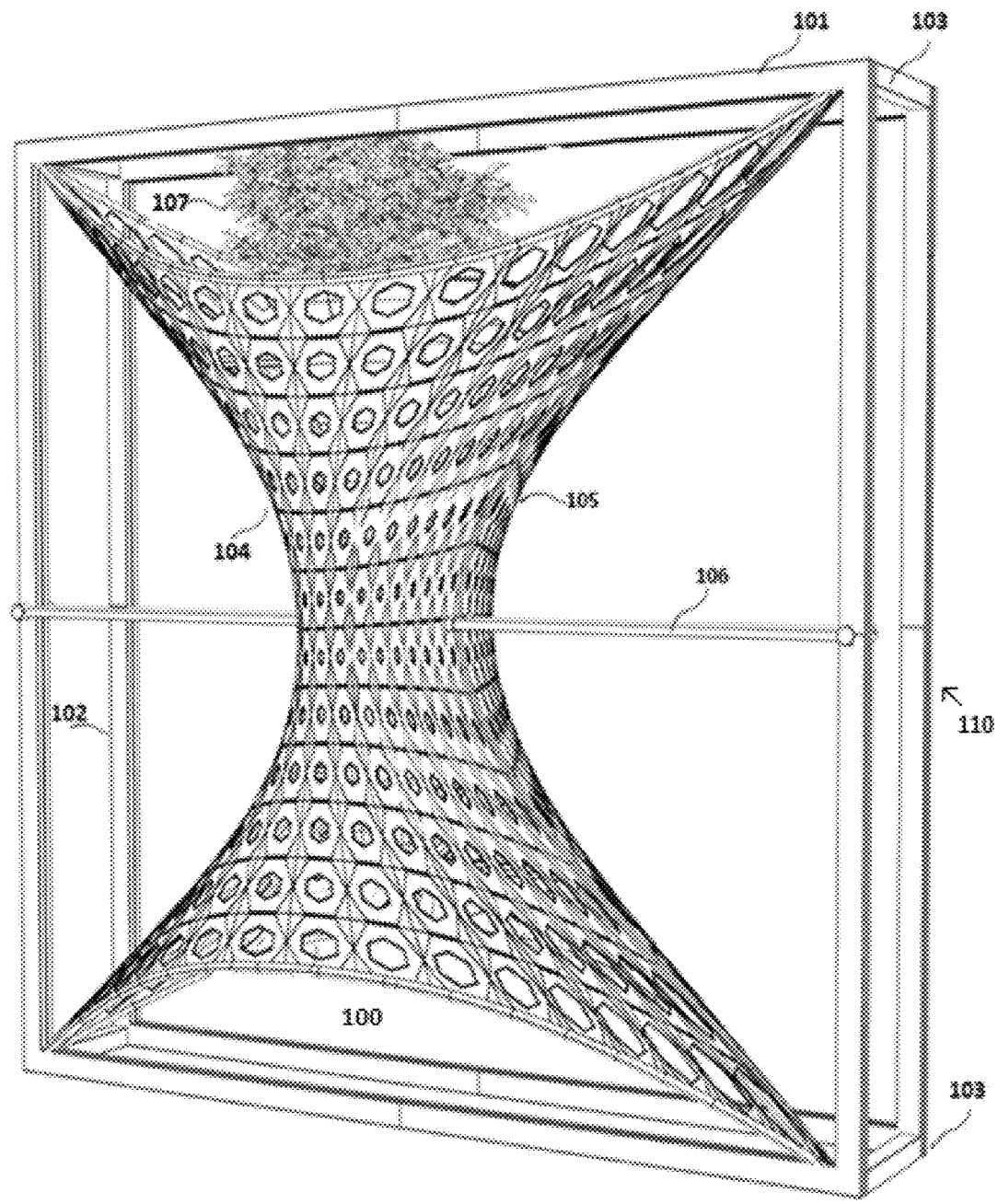
FIG. 1 is an isometric view of an implementation of the system in its closed configuration.
Figure 2:
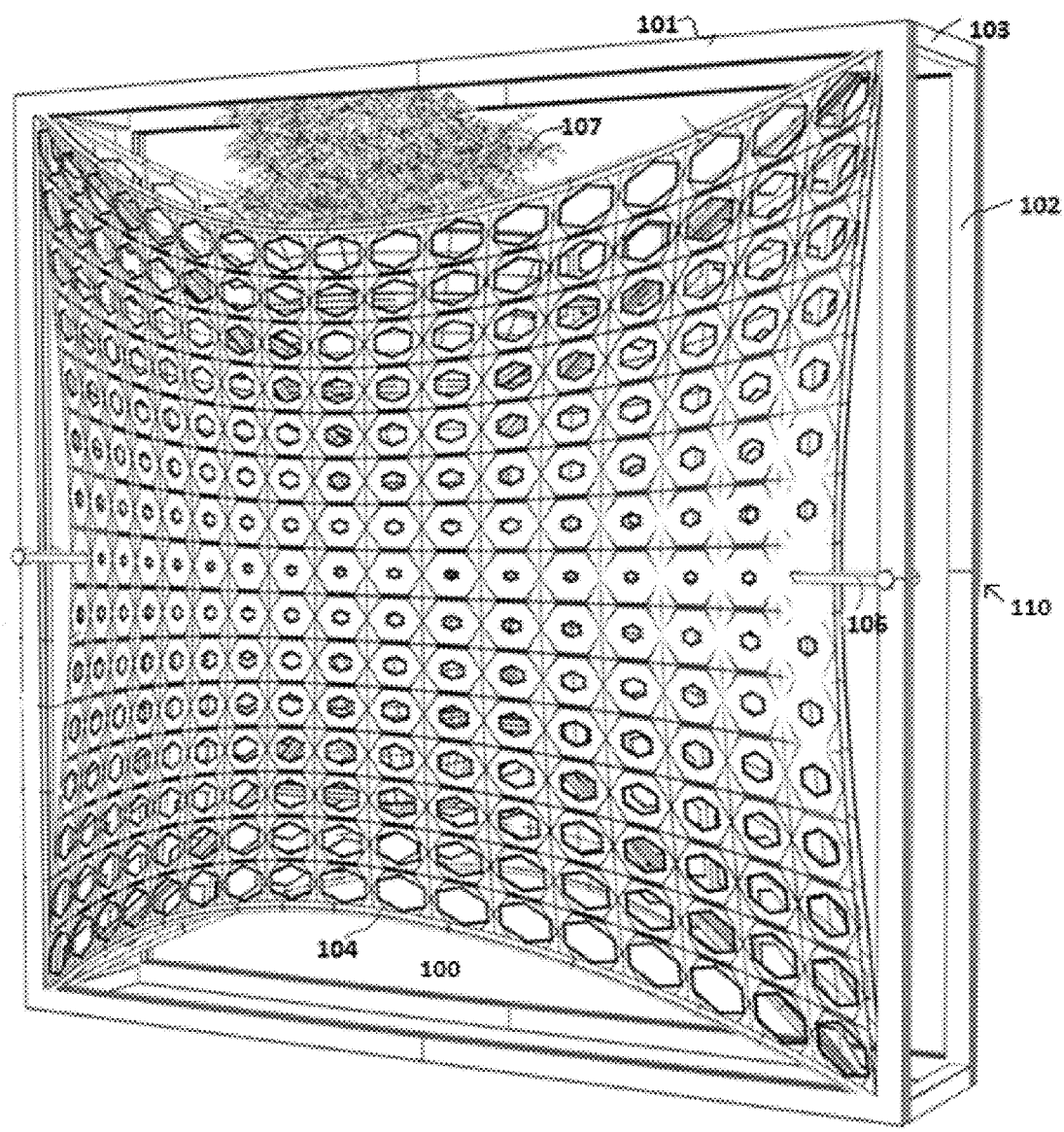
FIG. 2 is an isometric view of an implementation of the system in its open configuration.

FIGS. 1 and 2 provide an overview of an implementation of the environmental system ("system") 100. Referring to FIG. 1, a schematic view of an implementation of the system 100 in a closed configuration is depicted. FIG. 2 is a schematic view of an implementation of the system 100 in an open configuration. As shown in FIGS. 1 and 2, the system 100 includes a mounting structure 110 ("structure"), a first frame 101, a second frame 102, a plurality of bars ("bars") 103, a first skin 104, a second skin 105, one or more beams ("beams") 106, and optionally one or more plants 107, such as a flower, vegetable, herb, shrub, weed, or any other type of vegetation, greenery, flora, herbage, or verdure. Additional details regarding the various components and features of the system 100 are provided below.

The system 100 provides several functionalities for the building and window(s) it is installed or mounted on. In some cases, the system 100 can replace a traditional window. In another implementation, the system 100 can be disposed along an at least partially external portion of a building that is associated with a window or an opening in the said building. The system 100 is configured to provide shading for the windows or openings via either or both of the first skin 104 and the second skin 105. For example, a skin can be configured to be 'open' or collapsed on cloudy days and 'closed' or extended on sunny days when shading is required. Thus, in the open configuration, the system 100 can facilitate ventilation through adjustment of the size of the various openings that are formed in the skins. In other implementations, the system 100 can also include provisions to harvest rainwater that can be stored and/or used for multiple purposes depending on the requirements of the design. The rainwater can be collected in a vessel that can be placed, secured, or otherwise disposed in the structure. In some implementations, the system can also include a second vessel configured to house the plants 107 that provide greenery and additional aesthetics for the building. In one implementation, each of the two vessels are disposed between the two skins and secured to the structure 110.

Figure 3:
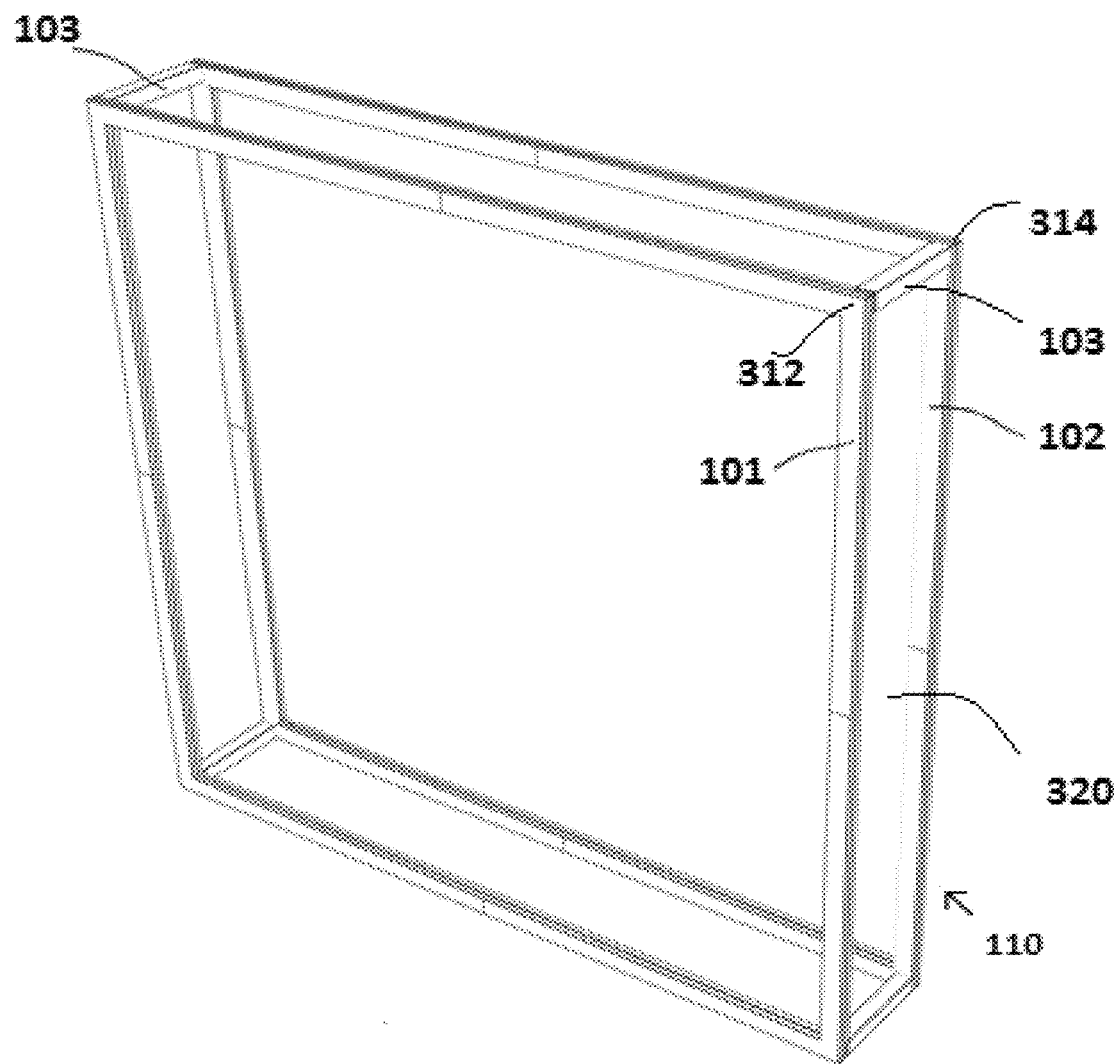
FIG. 3 is an isolated isometric view of an implementation of a mounting structure.

The system 100 can include a stable, secure platform in different implementations. Referring now to FIG. 3, an isolated view of the structure 110 of the system 100 is depicted. In some implementations, the structure 110 may be understood to provide a substantially fixed and stationary base, framework, support, chassis, skeleton, mounting frame, or a rudimentary housing. As shown in FIG. 3, in some implementations the structure 110 can include one or more frames, including first frame 101 and second frame 102. In some implementations, the first frame 101 can be understood to provide an 'inner frame' (disposed in a direction toward an interior of a building when installed) and the second frame 102 can be understood to provide an 'outer frame' (disposed in a direction toward an exterior of a building when installed). In some implementations, the two frames are arranged such that they are substantially parallel with respect to one another. In the Figures, each frame is substantially rectangular or square in shape. However, it should be understood that one or more of the frames may differ in shape, such as square, oval, triangular, hexagonal, or any other regular or irregular shape, and/or include linear or curved portions. For example, depending on the requirements of the building, the size and shape of an opening or window, the preference of the user, the type of weather or environmental conditions of the building location, the aesthetics of the building, and other such considerations, the design and shape of the frames can vary widely.

In different implementations, two or more frames can be connected to one another by bars 103 to form a network or "box"-like assembly that can generally define a three-dimensional internal space or cavity 320. The cavity 320 can be configured to receive, hold, secure, display, or otherwise contain various components of the system 100. Depending on the geometry of each frame, the bars 103 can connect, attach, extend between, span, bridge, or otherwise join the frames together. For example, in FIG. 3, a first bar 103 extends from a first corner 312 of the first frame 101 to a second corner 314, thereby connecting the two frames together. Thus, it can be understood that the two frames are spaced apart by one or more bars. In some implementations, if the bar is linear and arranged in a substantially perpendicular orientation relative to the frame, the two frames can be understood to be spaced apart by the length of the bar. However, in other implementations, the frames may be joined to one another along any portion of their respective lengths that provides a stable framework for the system. In addition, one or more bars may be linear or curved, and be oriented at any angle relative to the frame(s).

Figure 4:
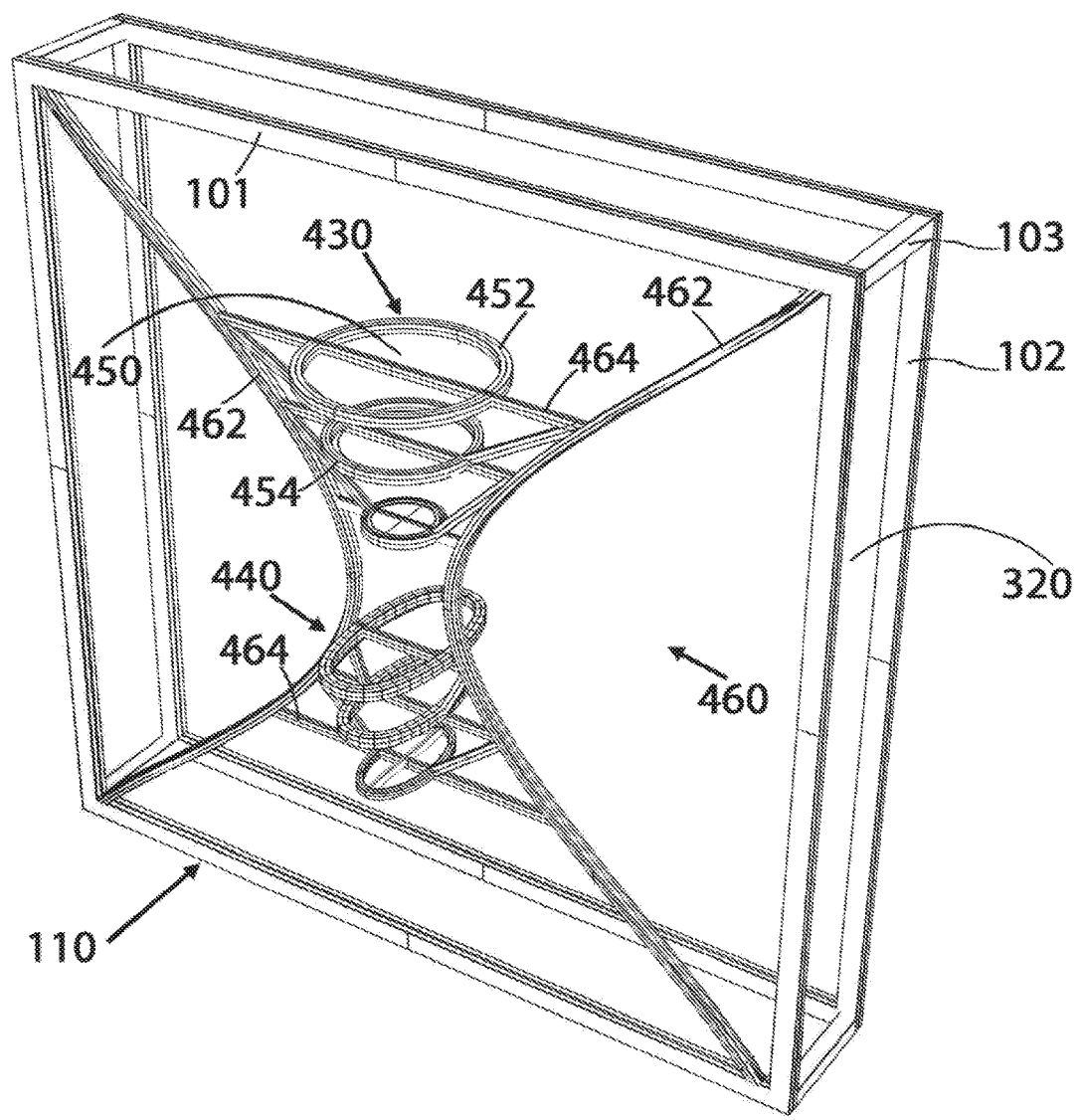
FIG. 4 is an isometric view of an implementation of the mounting structure and a structural support assembly.

Referring now to FIG. 4, a more detailed schematic view of an implementation of the components associated with the mounting structure 110 is depicted. In different implementations, the system 100 can include provisions for holding various plants and/or other components. In FIG. 4, it can be seen that the cavity 320 defined by the first frame 101 and the second frame 102 can include a first receiving portion 430 and a second receiving portion 440. The first receiving portion 430 and/or second receiving portion 440 can be held or supported by an array or structural support assembly ("assembly") 460 in some implementations. In FIG. 4, the assembly 460 includes a pair of curved arches 462 disposed on opposite sides of the system 100, as well as a plurality of trusses 464 that extend between the pair of curved arches 462 and provide a support network for the first receiving portion 430 and/or second receiving portion 440.

In some implementations, first receiving portion 430 and/or second receiving portion 440 can each include a series of concentric rings or hollow, relatively thin receiving framed openings 450 of varying geometry that may be arranged such that one framed opening is disposed above and/or below an adjacent framed opening in the vertical direction. In one implementation, the framed openings 450 can have similar sizes and shapes, while in other implementations two or more framed openings 450 can differ in size and/or shape. In FIG. 4, for example, a first framed opening 452 is larger than a second framed opening 454. Furthermore, in some cases, the set of framed openings 450 of either or both of first receiving portion 430 and second receiving portion 440 can increase in size or circumference in one direction. This arrangement can allow first receiving portion 430 and second receiving portion 440 to snugly or securely receive additional components, as described further below.

As noted above, in some implementations, the system can also include various types of receptacles or vessels. For example, in FIG. 5, a first receptacle 510 is shown, and in FIG. 6, a second receptacle 610 is shown. In some implementations, the first receptacle 510 can include a vessel, bowl, dish, basin, large cup, housing, vase, pot, or other such container that includes provisions for holding or growing plants and/or soil. It should be understood that the first receptacle 510 and the second receptacle 610 can include any shape, size, or design based on the type and size of the plant and/or the preference of the user, and the corresponding receiving portion in the structure can be adjusted in size and shape to accommodate the three-dimensional shape of the receptacle. In some implementations, the components of a receiving structure can be removable or replaceable to allow a user to customize the system.

Figure 5:
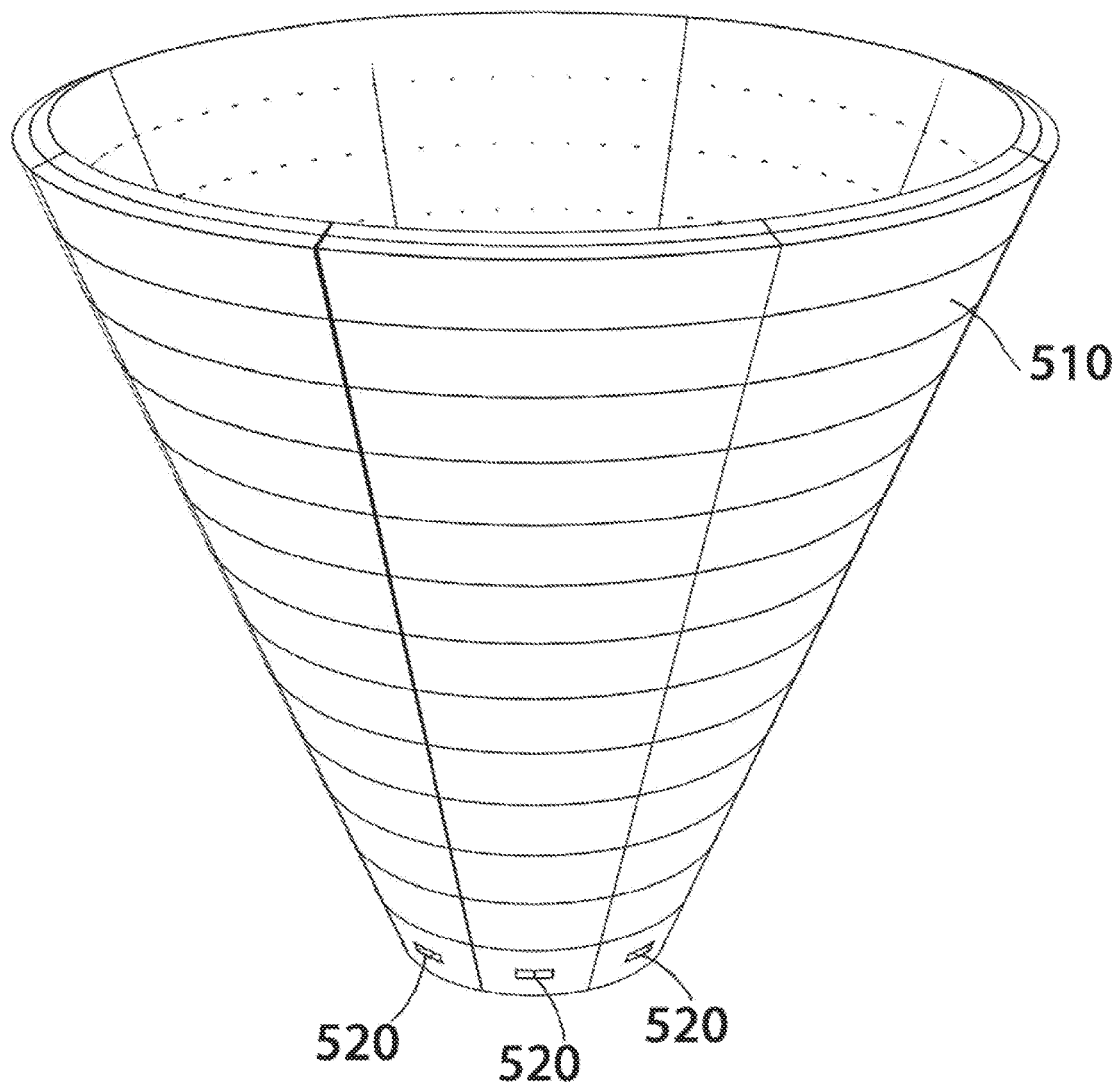
FIG. 5 is an isometric view of an implementation of a first receptacle.

As shown in FIG. 5, in one implementation, the first receptacle 510 can include a substantially circular cross-section. In addition, in one implementation, the first receptacle 510 can include a substantially elongated, conical three-dimensional shape, which can be configured to fit snugly into the first receiving portion 430 (see FIG. 4). Thus, in some cases, the rings of the receiving portion can be selected or provided to correspond to the size and shape of the first receptacle 510, or the rings can be exchanged to accommodate a differently sized or shaped receptacle.

In some other implementations, the first receptacle 510 can include provisions for discarding excess water in the receptacle. In one implementation, the first receptacle 510 includes a plurality of slots 520. In FIG. 5, the slots 520 have a substantially rectangular shape and are arranged or disposed along a bottom portion of the receptacle, such that water flowing downward as a result of gravity can escape through the slots 520. The excess water can flow into a water collection receptacle disposed below, as described below in FIG. 6.

It should be understood that in different implementations the first receptacle 510 and any corresponding plants can be accessible from the inside or an interior of the building, and/or the exterior of the building, for watering or other maintenance purposes. In some implementations, a system of drip irrigation can also be used for watering the plants. In this method, one or more irrigation pipes can run along the beams and/or the frames of the mounting structure (see FIGS. 3 and 4 above). In some implementations, there can be a plurality of holes formed in the receptacle that can facilitate the misting, watering, feeding, or aeration of the plant. Such holes may be arranged along the surface of the receptacle to allow fluid communication into an interior of the receptacle.

Figure 6:
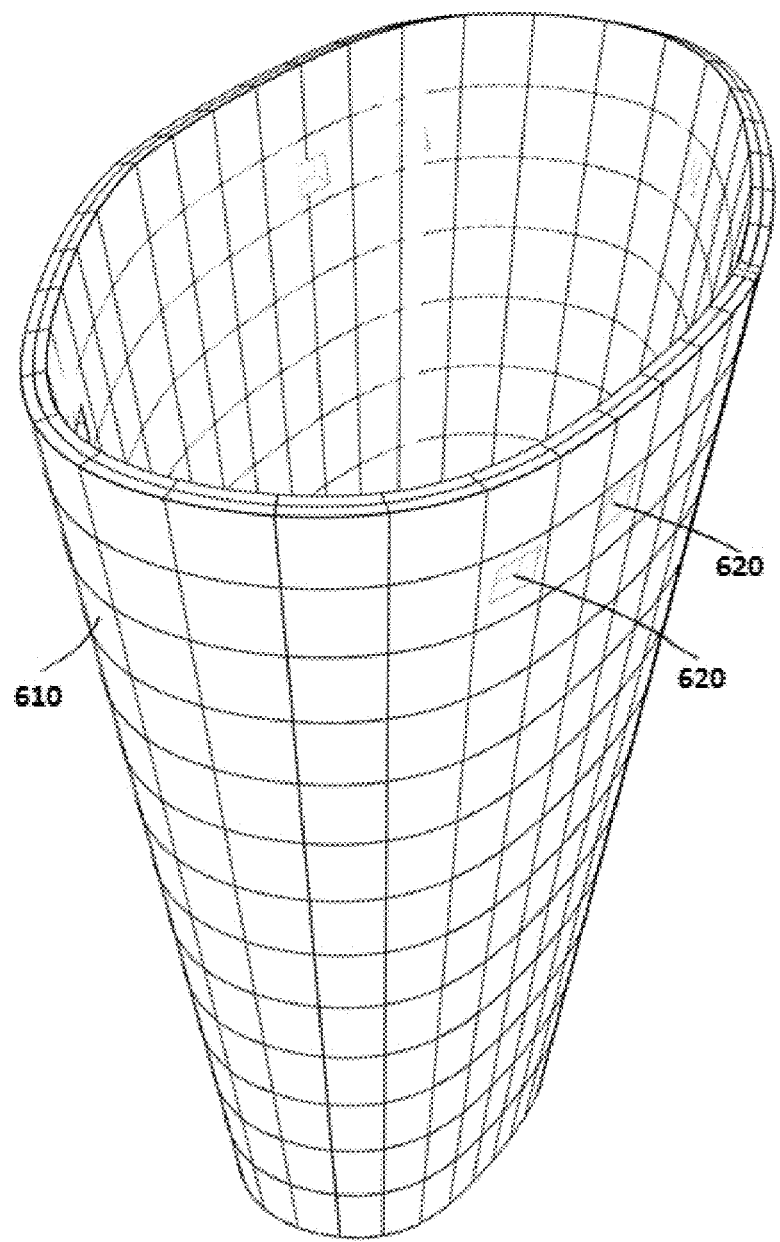
FIG. 6 is an isometric view of an implementation of a second receptacle.

In other implementations, the system may also include a rainwater collection apparatus such as the second receptacle 610, which can include provisions for receiving or collecting water, such as rainwater. The second receptacle 610 can also vary in size and/or shape, as discussed above with respect to the first receptacle. In FIG. 6, the second receptacle 610 includes a substantially elliptical cross-section, and is seen to be wider toward the top and narrower toward the bottom. In rainy conditions and when the skins are in closed configuration, the skins can act as a funnel and direct rainwater into the second receptacle 610. The water stored in the second receptacle 610 can be used for different applications in the building, or may be purified and used as drinking or potable water. In some implementations, the second receptacle 610 includes one or more openings 620 that can provide a means of discarding excess water.

Figure 7:
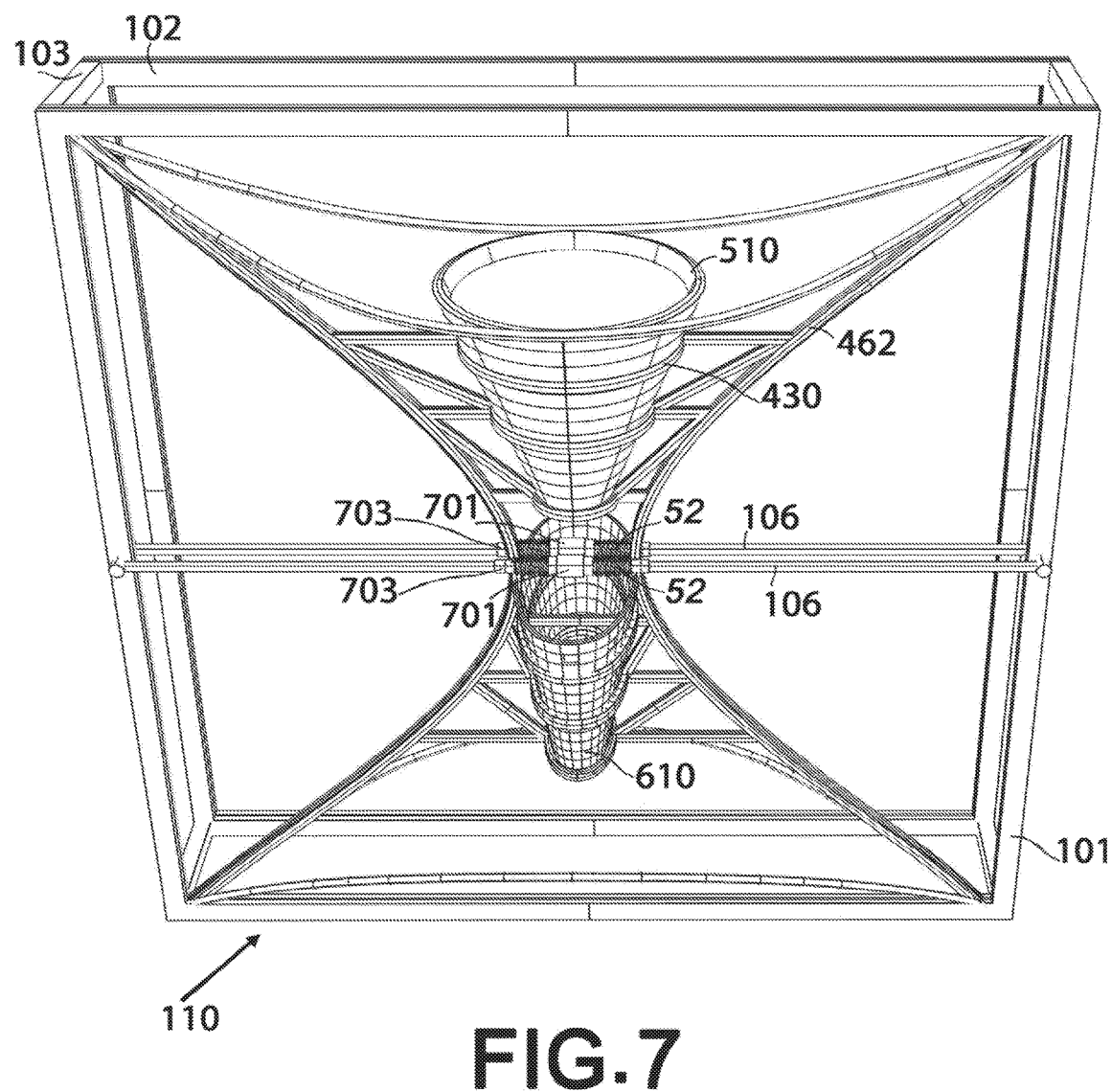
FIG. 7 is a front view of an implementation of the mounting structure, structural support assembly, receptacles, and motorized mechanism.

In different implementations, the system can include provisions for automatically opening and closing the skins. Referring now to FIG. 7, an implementation of the assembled structure is depicted, including the two receptacles and a mechanism configured to open and close the skins. In some implementations, the mechanism may include one or more motor assemblies. For example, a motor assembly can include at least a motor and a coil in some implementations. In different implementations, the motor can be a DC motor. In FIG. 7, a set of motors 701 (including a first motor and a second motor) facilitates the opening and closing of the skins. In one implementation, each skin is equipped or associated with its own independent motor. A coil 702 may be attached to each motor and assist in the process of opening and closing of the skins. One end of each coil engages with or is attached to a motor and the other end engages with or is attached to a skin. For example, the coil can be attached at one of the points identified by portions 703 in FIG. 7.

As one motor of the set of motors 701 turns, the associated coil 702 for that motor will close or open, and with the coil's movement the corresponding skin can transition between the open or closed configurations. In different implementations, the power for the motors can be supplied by a rechargeable battery attached to a photocell that can facilitate the charging process through exposure to sun rays. This may offer advantages in energy efficiency, as some implementations are designed for outdoor window or external surface usage and are likely to receive consistent and/or regular exposure to the sun. There are, however, no limitations on how the power is supplied to the motor. Power to the motor can be provided through various means including but not limited to batteries, photo cells, the building's own electrical system, and other power sources.

It should be understood that in some implementations the two motors depicted in FIG. 7 can be controlled independently. In other words, at any given time, both skins can be in the open configuration or the closed configuration, or one skin can be in the open configuration while the other is in the closed configuration (or in states between the closed and open configuration). The motors can be operated by various means. For example, they can be operated automatically through programmable integrated circuits (ICs) or other logic devices, remote or radio controllers, wireless devices, Bluetooth enabled devices, manually by an operator, or other such means.

Figure 8A:
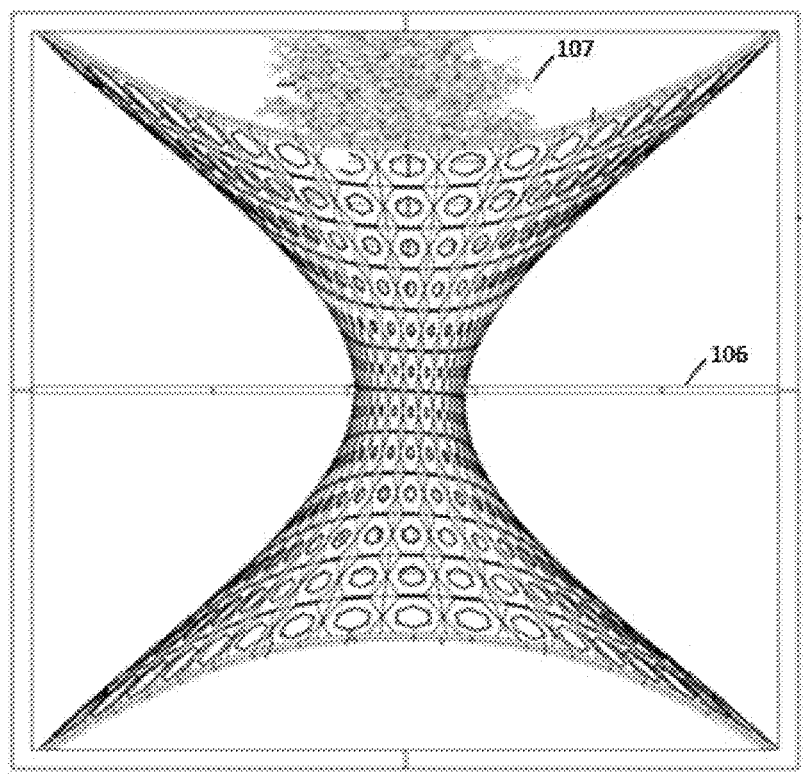
FIG. 8A is a front view of an implementation of the system in an closed configuration, and FIG. 8B provides a front view of an implementation of the system in an open configuration.
Figure 8B:
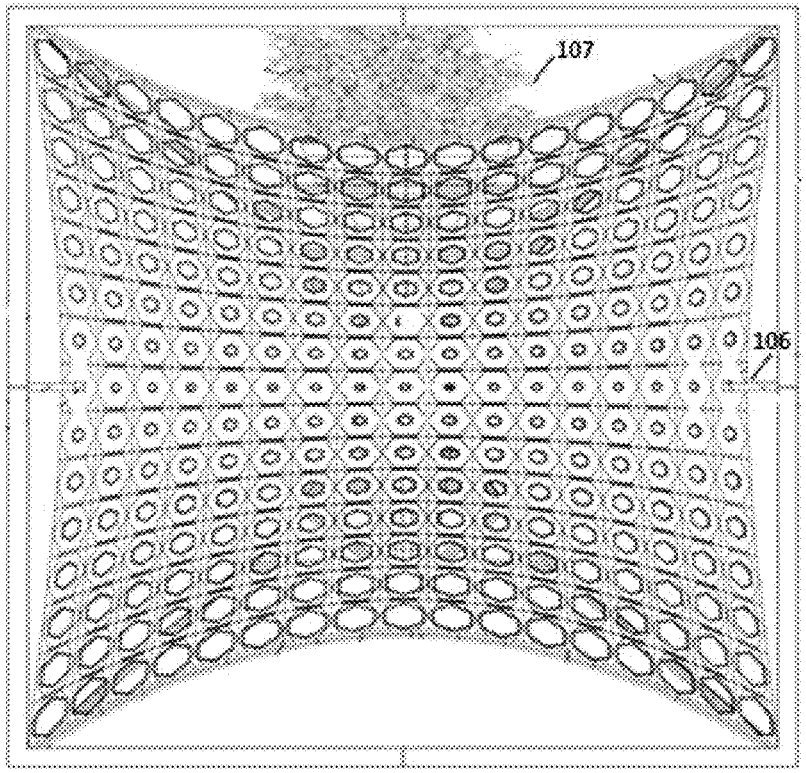

As noted earlier, the system 100 can include one or more skins. Referring now to FIGS. 8A and 8B, examples of the closed configuration and the open configurations are provided for the reader. As indicated above with respect to FIG. 7, the first skin 104 and the second skin 105 can operate together or in concert, and/or independently of one another, thereby providing varying degrees of ventilation and shade. As shown in FIGS. 8A and 8B, the skins can include materials that are configured to elastically move and change shape and size. Thus, in some cases, a skin may be understood to resemble a highly flexible, resilient, and elastic curtain that is attached to or mounted along one of the frames. The skin can be pulled open or expanded, or can be pulled inward and compressed.

Thus, in different implementations, the skins are configured to be expandable away from and compressible toward a central region. The structure can include provisions for supporting the skins as they transition between configurations. For example, in FIGS. 8A and 8B, beams 106 extend in a substantially horizontal direction along the structure near the midline. Beams 106 can help support the alignment of the skins as they transition between configurations. In some cases, each skin can be associated with a corresponding beam.

As shown in FIG. 8A, in one implementation, the skins may generally include a three-dimensional hourglass shape in the closed configuration. In the closed configuration, the skins can be arranged to allow rays from the sun to pass through the system with minimal obstruction. In addition, as noted above, in some implementations, one or more of a type of plant 107 may be disposed in the structure to provide greenery for the building. In one implementation, a plant can be inserted or disposed in the region or cavity between the two skins, or in an interior of the system.

Figure 9:
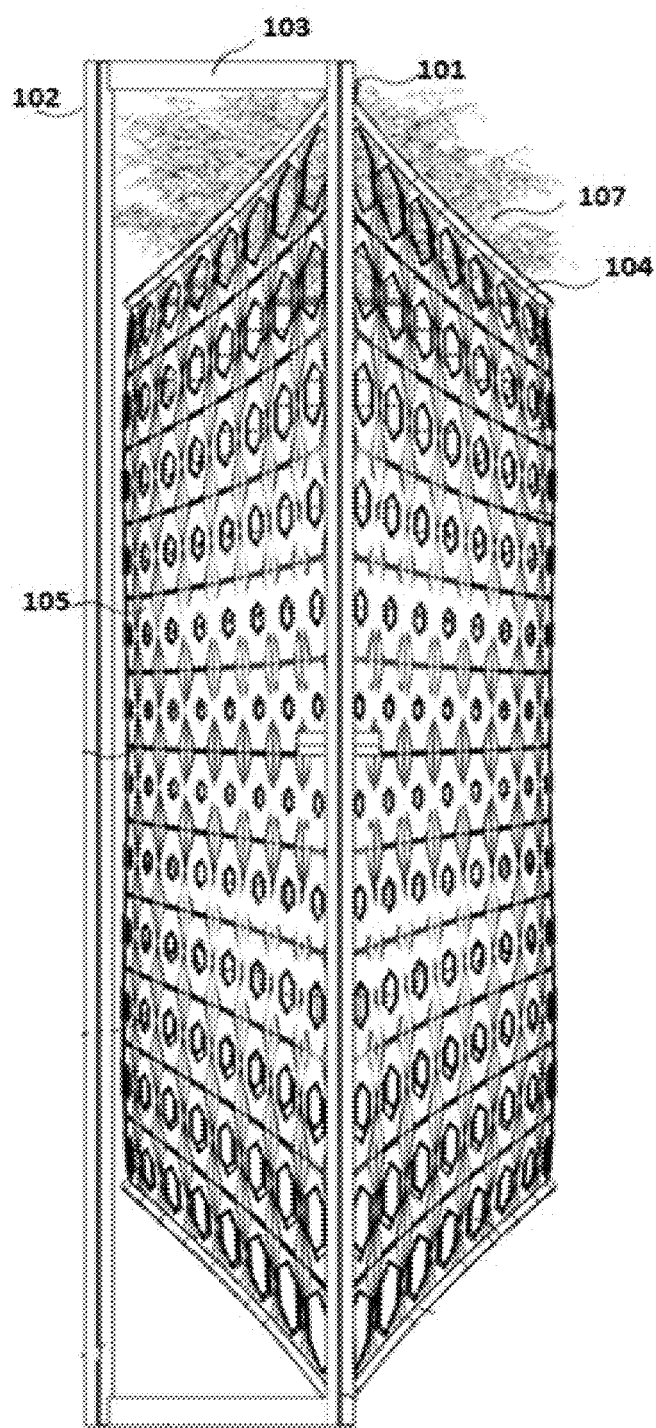
FIG. 9 is a side view of an implementation of the system in the open configuration.

In FIG. 8B, the skins are in the open configuration. In the open configuration, the skins are arranged such to minimize exposure of the building to rays of the sun. Thus, in one implementation, a skin has a substantially stretched, flat shape in the open configuration. In some cases, this configuration can provide increased shade for a portion of the building. For purposes of clarity, FIG. 9 presents a side view of an implementation of the system in the open configuration.

Figure 10:
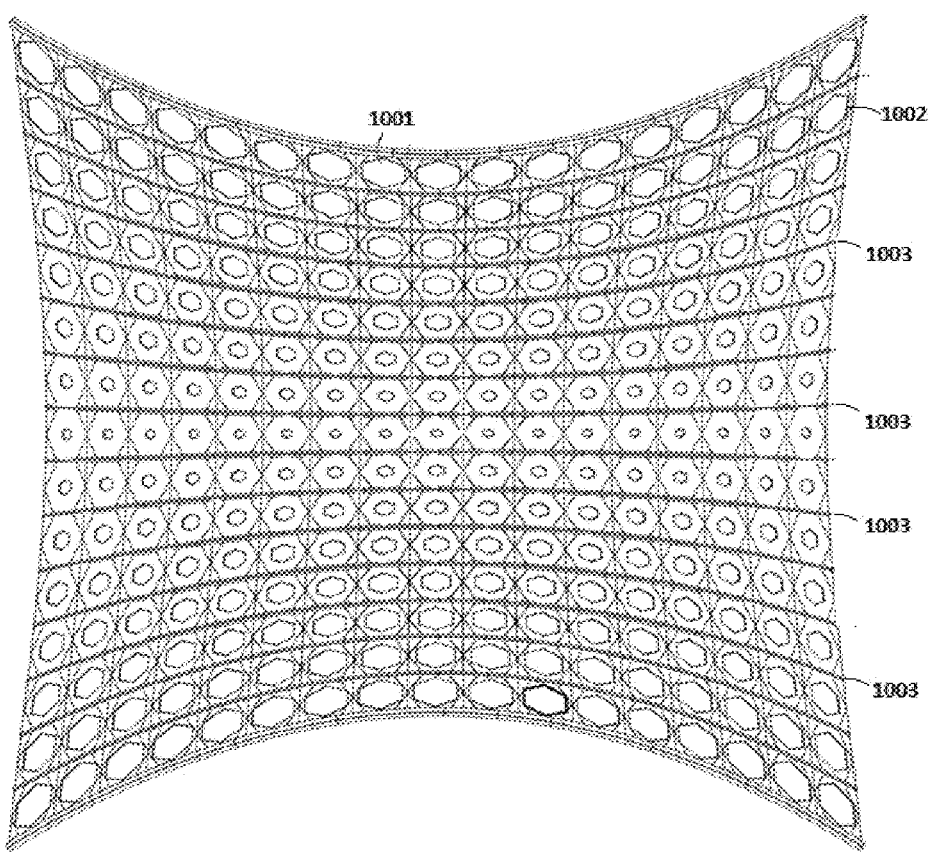
FIG. 10 is an isolated view of an implementation of the skins.

In order to better illustrate some of the disclosed implementations, FIG. 10 provides an isolated view of an implementation of the skins used in the system (e.g., the inner skin and outer skin). In some implementations, one or both skins can include provisions for permitting air movement and ventilation through the system. For example, in FIG. 10, both skins include a plurality of openings 1001. In different implementations, the size and/or shape of the openings 1001 can vary, and/or one opening can include a smaller/larger size or different shape relative to another opening along the same skin. For example, in the implementation shown in FIG. 10, the area or size associated with each of the openings 1001 toward the center of the skins is smaller relative to the area of the openings that are formed further from the center (i.e., nearer to the outer perimeter or edge of the skins). However, in other implementations, the size and/or shape of the openings can be arranged in other patterns along the skin. In some implementations, the size of the openings throughout the skin is substantially similar while in other implementations the sizes differ based on the requirements of the system and desires of the user.

The material of one or both skins can vary in different implementations. In one implementation, a fabric, textile, or other elastic material can be used. In different implementations, one or more materials with relatively elastic characteristics can be used for the skins. In some implementations, the material is also durable and able to withstand exposure to external elements such as but not limited to wind, rain, moisture, snow, extreme heat or cold, and other such elements. In some implementations, the skins can include plastics, such as fluorine-based plastics, plastics with high corrosion resistance and strength over a wide temperature range, as some non-limiting examples, the skins can include High Flexible Poly Urethane and/or Natural Rubber.

In some other implementations, the size of the opening can be automatically adjusted in response to the temperature of the outside environment. For example, in one implementation, at least the portions of skin surrounding or otherwise associated with an opening can include a "Shape Memory Allow" (SMA) material, smart metal, memory metal, memory alloy, muscle wire, smart alloys, auxetics, and other materials that remember their original shape, and that when deformed are able to substantially return to the pre-deformed shape. In some implementations, when the temperature rises, the dimensions associated with various portions of the material can increase, such that the openings become larger, thereby allowing more air to pass through the skin. Similarly, when the temperature drops, the dimensions associated with various portions of material can decrease, such that the openings become smaller, thereby limiting the movement of the air from one side of the skin to the other side.

In some implementations, the openings are bounded, framed, shaped, supported by, mounted on, or otherwise associated with SMA wires, where a length of the wire that helps define the opening can change with fluctuations in temperature. Thus, in one example, at higher temperatures the wires grow or expand in length, which also increases the size of the associated openings. Similarly, in colder temperatures, the length of the wires decreases or shrinks, which also decreases the size of the associated openings.

Furthermore, as noted above, the shapes of the openings can vary. In the implementation shown FIG. 10, the openings are substantially hexagonal. However, in other implementations, the openings can be circular, square, triangular, rectangular, pentagonal, oval, star-shaped, or include any other regular or irregular shape based on the requirements of the design and/or the desires of a user. In addition, the shape of an opening can change as it transitions between the open configuration and the closed configuration.

In some implementations, the system can include provisions to facilitate easier movement of the skins when transitioning from an open configuration to a closed configuration. In FIG. 10, a series of springs (coils) 1003 are disposed along the width of the skins. As the skins are opened or closed in response to environmental changes, these coils will extend or shrink to help control the movement of the skin.

Figure 11:
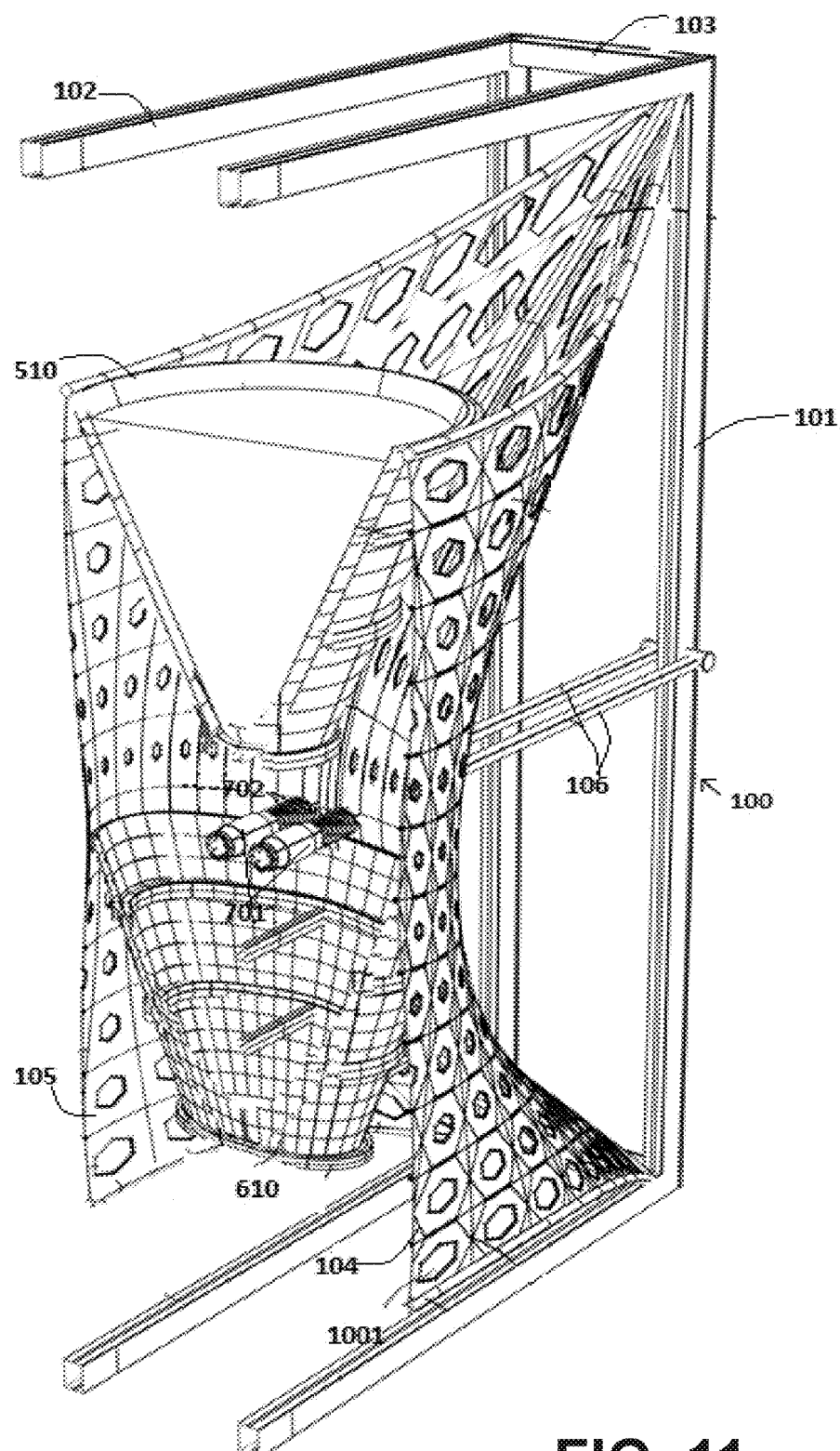
FIG. 11 is a cutaway view of an implementation of the system.
Figure 12:
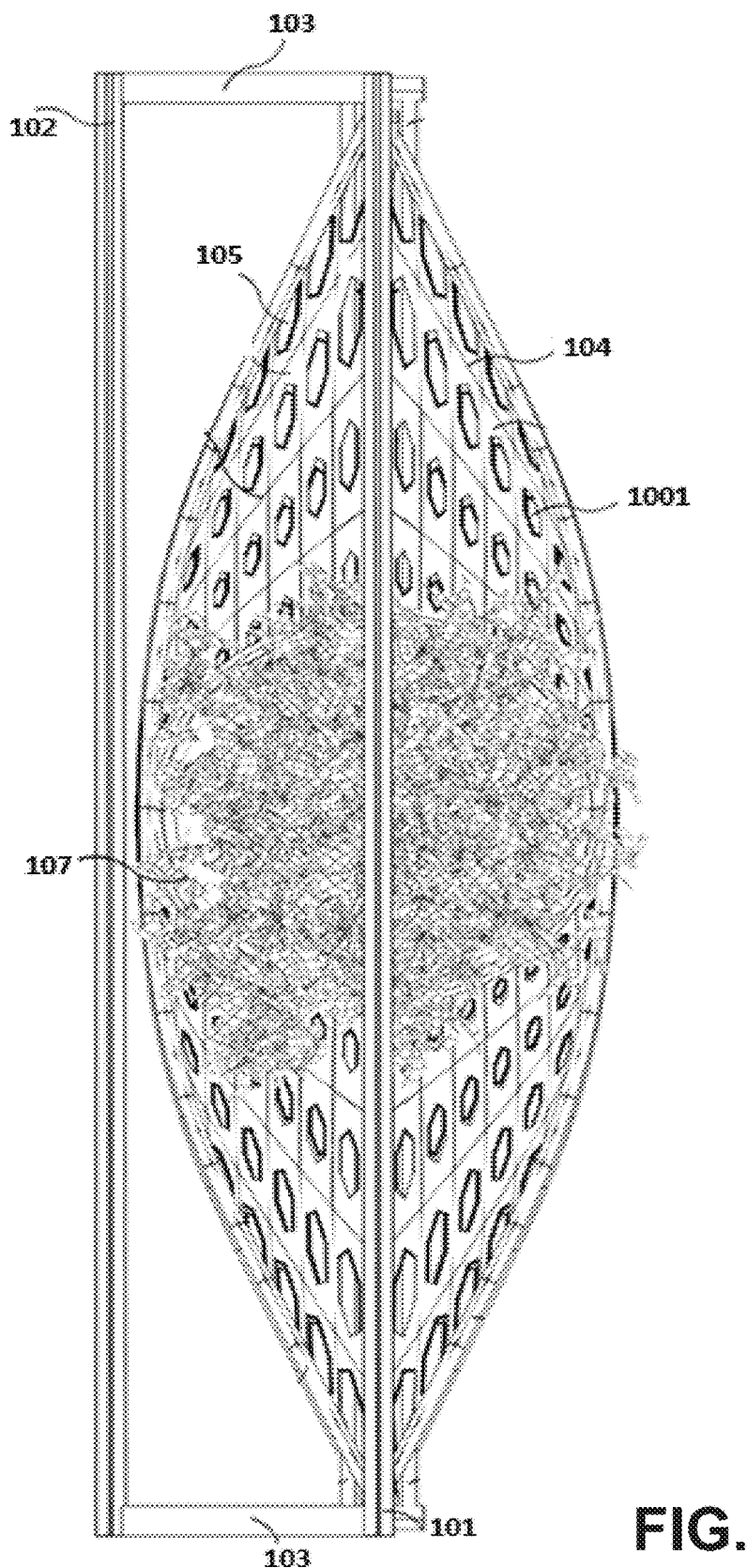
FIG. 12 is a top view of an implementation of the system.

For purposes of clarity, FIG. 11 depicts a cutaway view of an implementation of the environmental system, providing another perspective of the various components in the assembled condition. Similarly, FIG. 12 presents a top-view of an implementation of the system in which a plant can be seen located within the interior space bounded by the two skins.

Figure 13A:
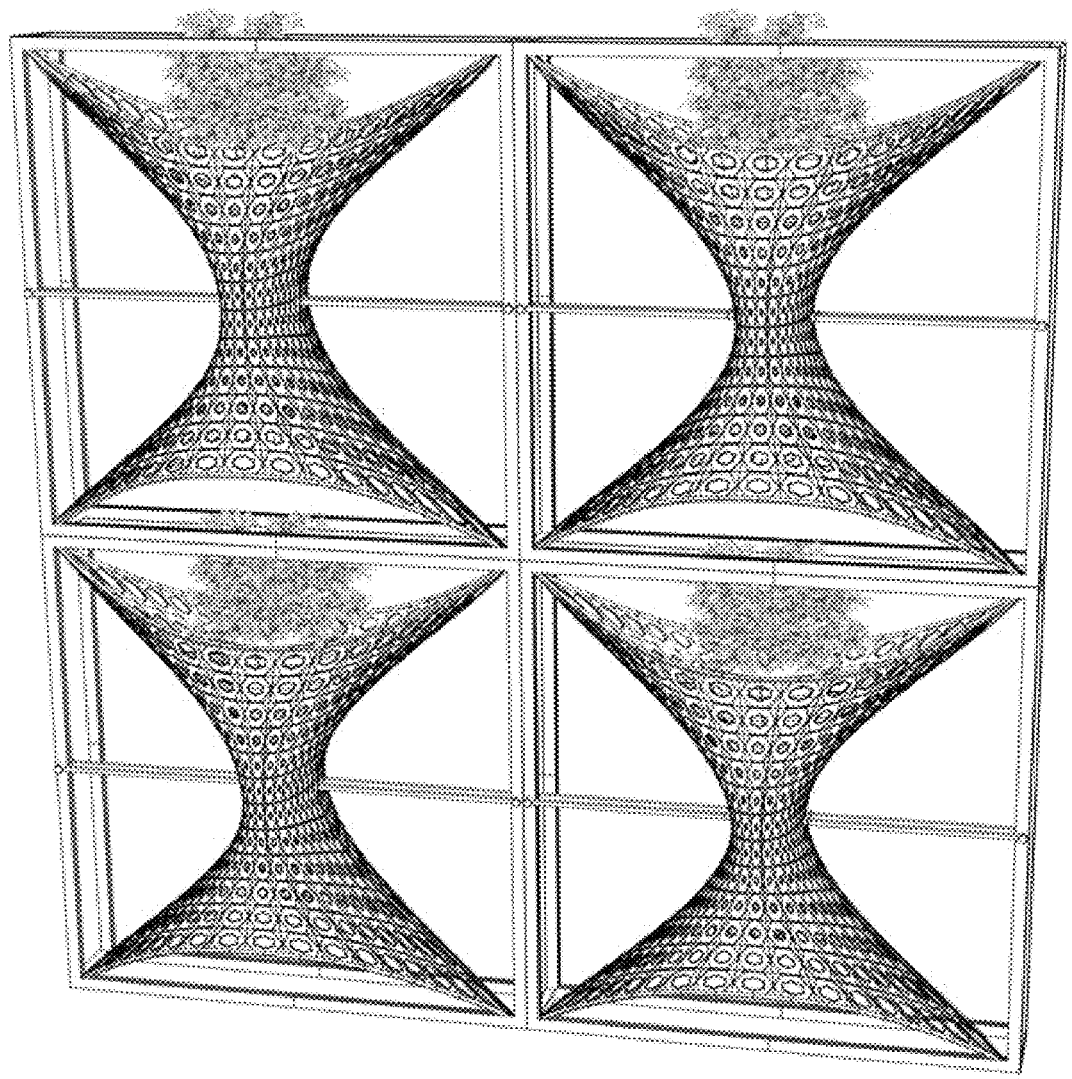
FIG. 13A depicts an implementation of a plurality of systems where each set of skins are in the closed configuration.
Figure 13B:
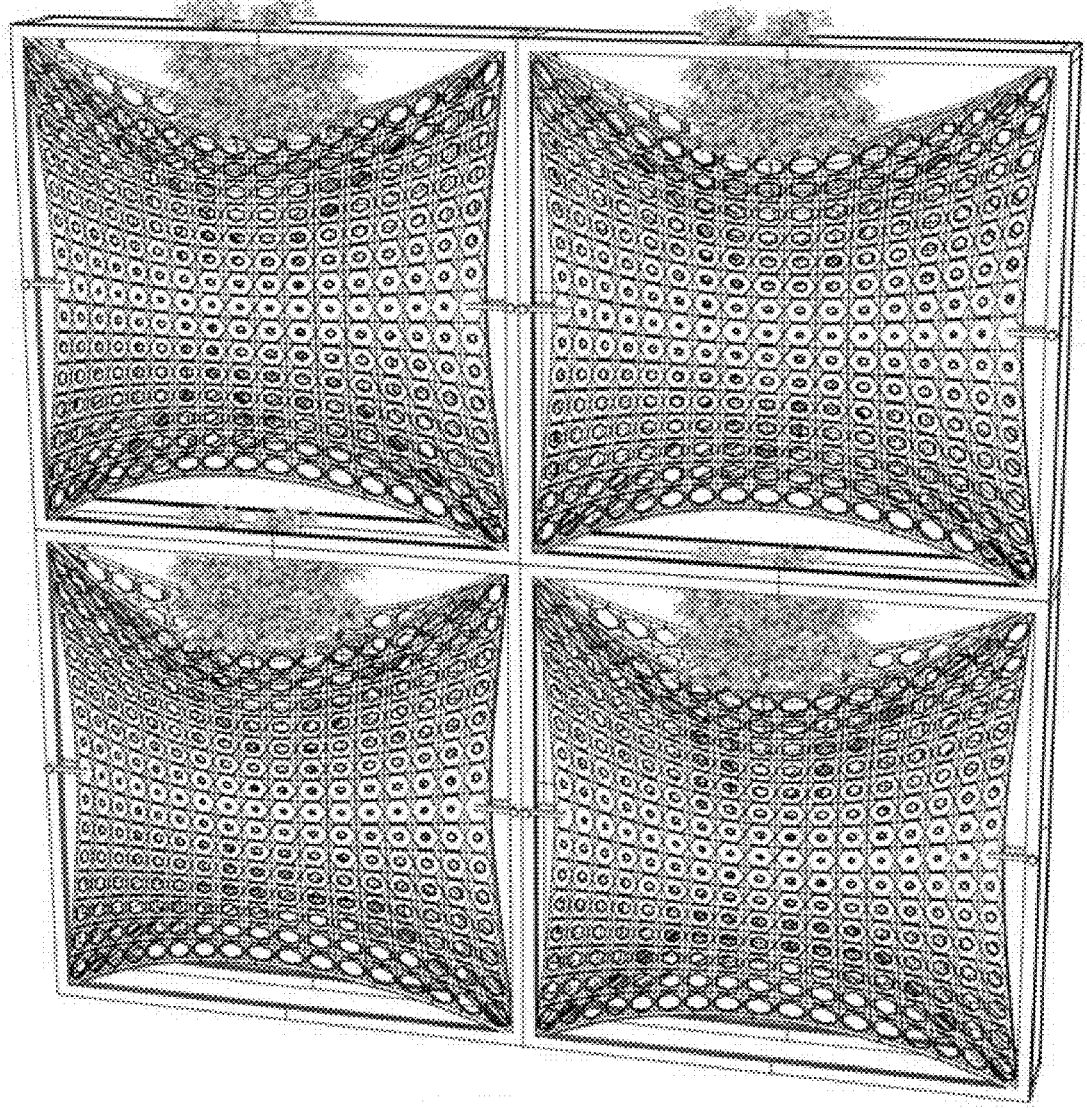
FIG. 13B depicts an implementation of the plurality of systems where each set of skins are in the open configuration.
Figure 13C:
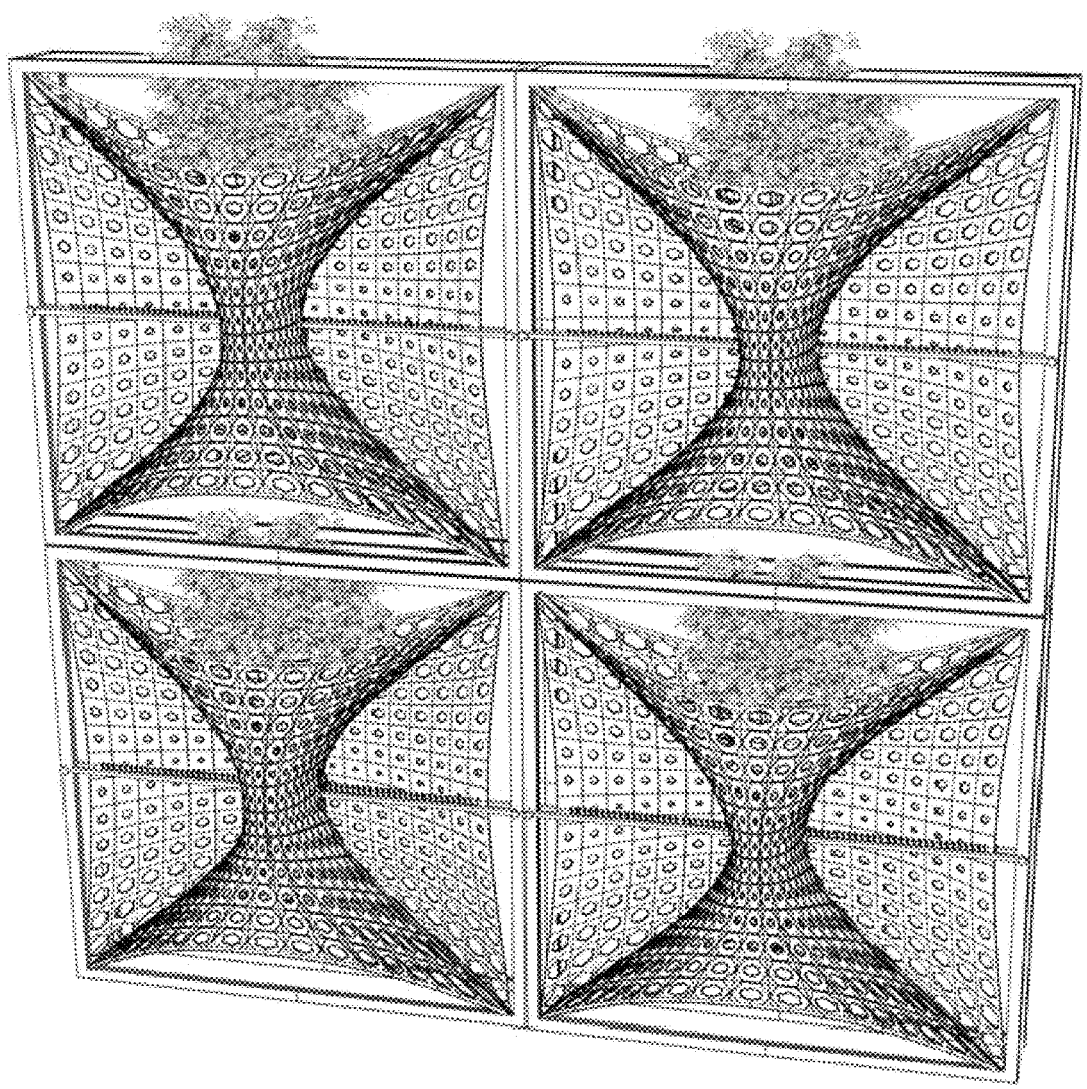
FIG. 13C depicts an implementation of the system where one skin is in open configuration and one is in the closed configuration.

In different implementations, the system described herein may be installed or used in buildings with multiple windows or openings, or a plurality of environmental systems can be combined across a single window or opening. FIGS. 13A-13C illustrate one implementation of a plurality of systems, or an environmental system grouping that is arranged in a 2×2 configuration. In other implementations, a building can integrate or use multiple systems arranged in any pattern. For example, a building with at least two rows of windows (e.g., at least two floors) can include the disclosed systems in all of the windows, in one row of windows, in one window upstairs and one window downstairs, in a single window, or in any other arrangement.

Referring to FIG. 13A, an implementation of the environmental system grouping is depicted in which both skins for each system are in the closed configuration. This formation provides the least amount of shading for each of the windows, and is the most likely configuration for use in cold climates or winter months. It should be understood that the application of this configuration along with the ones presented hereafter can depend on the requirements of the building and the preferences of its residents.

FIG. 13B illustrates an implementation of the environmental system grouping in which both skins for each system are in the open configuration. This formation provides the greatest amount of shading for each of the windows, and is the most likely configuration for use in hot climates or summer months.

In FIG. 13C, an implementation of the environmental system grouping is illustrated in which the first skin is in the open configuration and the second skin is in the closed configuration for each system. This formation represents one example of how the two skins can be controlled independently. In some cases, in response to certain environmental conditions, one skin can be closed and the other left open, as shown herein, providing an intermediate configuration. While the outer skin is in the closed configuration and the inner skin is in the open configuration in FIG. 13C, in other implementations, this can be reversed, such that the outer skin is in the open configuration while the inner skin is in the closed configuration. In another implementation, the two skins of one system can be in the closed configuration, while an adjacent system can include skins in the open configuration, and/or a third adjacent system can be in the intermediate configuration. This can allow the system(s) to deliver an optimized environmental response across varying conditions, and fine-tune the shading, ventilation, and/or view provided to the interior of a building.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A ventilation system for a building, the system comprising:
  a mounting structure including a first frame; and
  a first skin being mounted onto the first frame, wherein:
    the first skin includes a plurality of openings, and the plurality of openings includes a first opening that is configured to change in size, the first opening has a first size when the first skin is at a first temperature, and the first opening transitions to a smaller, second size when the first skin is at a second temperature, and the second temperature is different from the first temperature, wherein:

the mounting structure further includes a second frame, the second frame being spaced apart from the first frame by at least a first bar, a second skin is mounted on the second frame, and the second skin is substantially similar to the first skin, and the ventilation system further includes a rainwater collection apparatus being disposed between the first skin and the second skin, the rainwater collection apparatus including a first receptacle configured to store water.

2. The system of claim 1, wherein the first opening returns to the first size when the first skin is at the first temperature again.

3. The system of claim 1, wherein the second temperature is lower than the first temperature.

4. The system of claim 1, wherein the first skin includes a shape memory alloy material.

5. The system of claim 1, wherein each of the plurality of openings is configured to change in size automatically in response to changes in temperature.

6. The system of claim 1, further including a second receptacle configured to support a living plant.

7. The system of claim 1, wherein the first skin has a closed configuration and an open configuration, wherein a surface area of the first skin is larger in the open configuration relative to the closed configuration.

8. A shading system for a building, the system comprising:

a mounting structure including a first frame and a second frame, the first frame and the second frame being substantially parallel to one another;

a first skin being mounted onto the first frame;

a second skin being mounted onto the second frame; and a first motor assembly being disposed between the first skin and the second skin, wherein:

the first motor assembly includes a first motor and a first coil, the first motor assembly is configured to transition the first skin between a closed configuration and an open configuration, and a surface area of the first skin is greater in the open configuration than the closed configuration.

9. The system of claim 8, further including a second motor assembly, the second motor assembly including a second motor and a second coil, the second motor assembly being configured to transition the second skin between the closed configuration and the open configuration.

10. The system of claim 9, wherein the first motor assembly and the second motor assembly operate independently of one another.

11. The system of claim 8, further including a programmable circuit arranged to automatically operate the first motor assembly.

12. The system of claim 8, further including a programmable circuit arranged to operate the first motor assembly in response to a command signal received from a remote station.

13. The system of claim 8, the first skin including a plurality of openings, the plurality of openings being configured to provide additional ventilation in the open configuration.

14. The system of claim 13, the plurality of openings including a first opening that is configured to change in size, wherein the first opening has a first size when the first skin is at a first temperature, wherein the first opening transitions to a smaller, second size when the first skin is at a second temperature, and wherein the second temperature is different from the first temperature.

15. The system of claim 14, wherein the first skin includes a shape memory alloy material.

16. The system of claim 8, further including a rainwater collection apparatus being disposed between the first skin and the second skin, the rainwater collection apparatus including a first receptacle configured to store water.

17. The system of claim 8, wherein the first skin includes a substantially hourglass shape in the closed configuration and a substantially stretched, flat shape in the open configuration.

\* \* \* \* \*